(12) United States Patent
Murgia

(10) Patent No.: US 9,508,345 B1
(45) Date of Patent: Nov. 29, 2016

(54) CONTINUOUS VOICE SENSING

(71) Applicant: Knowles Electronics, LLC, Itasca, IL (US)

(72) Inventor: Carlo Murgia, Sunnyvale, CA (US)

(73) Assignee: Knowles Electronics, LLC, Itasca, IL (US)

( * ) Notice: Subject to any disclaimer, the term of this patent is extended or adjusted under 35 U.S.C. 154(b) by 0 days.

(21) Appl. No.: 14/495,482

(22) Filed: Sep. 24, 2014

Related U.S. Application Data

(60) Provisional application No. 61/881,868, filed on Sep. 24, 2013.

(51) Int. Cl.
| | | |
|---|---|---|
| *H04M 1/00* | (2006.01) | |
| *G10L 15/22* | (2006.01) | |
| *G10L 21/0208* | (2013.01) | |

(Continued)

(52) U.S. Cl.
CPC ........... *G10L 15/22* (2013.01); *G10L 21/0208* (2013.01); *G10L 25/48* (2013.01); *G10L 25/84* (2013.01); *H04M 1/6058* (2013.01); *H04S 1/007* (2013.01); *G10L 2015/223* (2013.01)

(58) Field of Classification Search
CPC ... H04S 1/007; G10K 11/1782; G10L 15/00; G10L 2021/02082; G10L 2021/02165; G10L 21/0208; G10L 25/78; H04M 1/6058; H04R 1/005; H04R 5/04; H04R 17/02; H04R 19/04
USPC ....... 381/92, 111, 122, 57; 700/94; 704/251, 704/231, 275
See application file for complete search history.

(56) References Cited

U.S. PATENT DOCUMENTS 3,946,157 A 3/1976 Dreyfus
4,797,924 A 1/1989 Schnars et al.
(Continued)

FOREIGN PATENT DOCUMENTS

CN 104247280 A 12/2014
EP 2962403 A1 1/2016
(Continued)

OTHER PUBLICATIONS

International Search Report & Written Opinion dated Jun. 26, 2014 in Patent Cooperation Treaty Application No. PCT/US2014/018780, filed Feb. 26, 2014.
(Continued)

*Primary Examiner* — Vijay B Chawan
(74) *Attorney, Agent, or Firm* — Carr & Ferrell LLP

(57) ABSTRACT

Provided are methods and systems for continuous voice sensing. An example method allows for detecting and buffering, by a first module, a key phrase in an acoustic signal. Responsive to the detection, the method includes sending an interrupt to a second module and switching the first module to an omnidirectional microphone mode. Upon receiving the interrupt, the second module is operable to boot up from a low power mode to an operational mode. While the second module is booting up, the first module is operable to continue to buffer a clean speech output generated from an acoustic signal captured by at least one omnidirectional microphone. After the second module is booted, an indication may be sent to the first module that the second module is ready to exchange data through a fast connection. Upon receiving the indication, the buffered clean speech output may be sent to the second module.

17 Claims, 6 Drawing Sheets

(51) Int. Cl.
  *G10L 25/48* (2013.01)
  *G10L 25/84* (2013.01)
  *H04M 1/60* (2006.01)
  *H04S 1/00* (2006.01)

(56) References Cited

U.S. PATENT DOCUMENTS

| | | |
|---|---|---|
| 4,813,076 A | 3/1989 | Miller |
| 5,054,085 A | 10/1991 | Meisel et al. |
| 5,214,707 A | 5/1993 | Fujimoto et al. |
| 5,340,316 A | 8/1994 | Javkin et al. |
| 5,640,490 A | 6/1997 | Hansen et al. |
| 5,787,414 A | 7/1998 | Miike et al. |
| 6,018,708 A | 1/2000 | Dahan et al. |
| 6,067,517 A | 5/2000 | Bahl et al. |
| 6,535,850 B1 | 3/2003 | Bayya |
| 6,662,180 B1 | 12/2003 | Aref et al. |
| 6,757,652 B1 | 6/2004 | Lund et al. |
| 6,873,993 B2 | 3/2005 | Charlesworth et al. |
| 6,954,745 B2 | 10/2005 | Rajan |
| 7,016,836 B1 | 3/2006 | Yoda |
| 7,219,063 B2 | 5/2007 | Schalk et al. |
| 7,319,959 B1 | 1/2008 | Watts |
| 7,698,133 B2 | 4/2010 | Ichikawa |
| 7,904,296 B2 | 3/2011 | Morris |
| 7,983,915 B2 | 7/2011 | Knight et al. |
| 8,194,880 B2 | 6/2012 | Avendano |
| 8,275,616 B2 | 9/2012 | Jung et al. |
| 8,345,890 B2 | 1/2013 | Avendano et al. |
| 8,355,511 B2 | 1/2013 | Klein |
| 8,405,532 B1 | 3/2013 | Clark et al. |
| 8,447,596 B2 | 5/2013 | Avendano et al. |
| 8,473,287 B2 | 6/2013 | Every et al. |
| 8,538,035 B2 | 9/2013 | Every et al. |
| 8,543,399 B2 | 9/2013 | Jeong et al. |
| 8,712,776 B2 | 4/2014 | Bellegarda et al. |
| 8,718,299 B2 * | 5/2014 | Nishimura ............... H04R 5/04 381/122 |
| 8,880,396 B1 | 11/2014 | Laroche et al. |
| 8,903,721 B1 | 12/2014 | Cowan |
| 8,938,394 B1 | 1/2015 | Faaborg et al. |
| 9,143,851 B2 * | 9/2015 | Schober ............... H04R 1/1016 |
| 9,185,487 B2 | 11/2015 | Solbach et al. |
| 9,240,182 B2 | 1/2016 | Lee et al. |
| 9,437,188 B1 | 9/2016 | Medina et al. |
| 2002/0036624 A1 | 3/2002 | Ohta et al. |
| 2002/0041678 A1 | 4/2002 | Basburg-Ertem et al. |
| 2002/0097884 A1 | 7/2002 | Cairns |
| 2002/0138265 A1 | 9/2002 | Stevens et al. |
| 2003/0069727 A1 | 4/2003 | Krasny et al. |
| 2003/0161097 A1 | 8/2003 | Le et al. |
| 2003/0179888 A1 | 9/2003 | Burnett et al. |
| 2004/0029622 A1 | 2/2004 | Laroia et al. |
| 2004/0076190 A1 | 4/2004 | Goel et al. |
| 2004/0114772 A1* | 6/2004 | Zlotnick ............... H04R 3/12 381/92 |
| 2005/0010412 A1 | 1/2005 | Aronowitz |
| 2005/0060155 A1 | 3/2005 | Chu et al. |
| 2005/0159945 A1 | 7/2005 | Otsuka et al. |
| 2005/0171851 A1 | 8/2005 | Applebaum et al. |
| 2006/0074658 A1 | 4/2006 | Chadha |
| 2006/0074686 A1 | 4/2006 | Vignoli |
| 2006/0092918 A1 | 5/2006 | Talalai |
| 2006/0100876 A1 | 5/2006 | Nishizaki et al. |
| 2007/0064817 A1 | 3/2007 | Dunne et al. |
| 2007/0073536 A1 | 3/2007 | Clark et al. |
| 2007/0081636 A1 | 4/2007 | Shaffer et al. |
| 2007/0154031 A1 | 7/2007 | Avendano et al. |
| 2007/0256027 A1 | 11/2007 | Daude |
| 2007/0262863 A1 | 11/2007 | Aritsuka et al. |
| 2008/0004875 A1 | 1/2008 | Chengalvarayan et al. |
| 2008/0010057 A1 | 1/2008 | Chengalvarayan et al. |
| 2008/0019548 A1 | 1/2008 | Avendano |
| 2008/0071547 A1 | 3/2008 | Prieto et al. |
| 2008/0140479 A1 | 6/2008 | Mello et al. |
| 2008/0157129 A1 | 7/2008 | Hsu et al. |
| 2008/0195389 A1 | 8/2008 | Zhang et al. |
| 2009/0024392 A1 | 1/2009 | Koshinaka |
| 2009/0083034 A1 | 3/2009 | Hernandez et al. |
| 2009/0125311 A1 | 5/2009 | Haulick et al. |
| 2009/0146848 A1 | 6/2009 | Ghassabian |
| 2009/0192795 A1 | 7/2009 | Cech |
| 2009/0220107 A1 | 9/2009 | Every et al. |
| 2009/0235312 A1 | 9/2009 | Morad et al. |
| 2009/0238373 A1 | 9/2009 | Klein |
| 2009/0254351 A1 | 10/2009 | Shin et al. |
| 2009/0270141 A1 | 10/2009 | Sassi |
| 2009/0323982 A1 | 12/2009 | Solbach et al. |
| 2010/0082346 A1 | 4/2010 | Rogers et al. |
| 2010/0082349 A1 | 4/2010 | Bellegarda et al. |
| 2010/0121629 A1 | 5/2010 | Cohen |
| 2010/0198598 A1 | 8/2010 | Herbig et al. |
| 2010/0204987 A1 | 8/2010 | Miyauchi |
| 2010/0305807 A1 | 12/2010 | Basir et al. |
| 2010/0312547 A1 | 12/2010 | Van Os et al. |
| 2010/0324894 A1 | 12/2010 | Potkonjak |
| 2011/0029359 A1 | 2/2011 | Roeding et al. |
| 2011/0145000 A1 | 6/2011 | Hoepken et al. |
| 2011/0218805 A1 | 9/2011 | Washio et al. |
| 2011/0255709 A1* | 10/2011 | Nishimura ............... H04R 5/04 381/92 |
| 2011/0257967 A1 | 10/2011 | Every et al. |
| 2011/0275348 A1 | 11/2011 | Clark et al. |
| 2011/0293102 A1 | 12/2011 | Kitazawa et al. |
| 2011/0293103 A1* | 12/2011 | Park ............... G10K 11/1782 381/57 |
| 2012/0010881 A1 | 1/2012 | Avendano et al. |
| 2012/0027218 A1 | 2/2012 | Every et al. |
| 2012/0166184 A1 | 6/2012 | Locker et al. |
| 2012/0224456 A1 | 9/2012 | Visser et al. |
| 2013/0097437 A9 | 4/2013 | Naveh et al. |
| 2013/0211828 A1 | 8/2013 | Gratke et al. |
| 2013/0260727 A1 | 10/2013 | Knudson et al. |
| 2013/0311184 A1 | 11/2013 | Badavne et al. |
| 2014/0006825 A1 | 1/2014 | Shenhav |
| 2014/0025379 A1 | 1/2014 | Ganapathiraju et al. |
| 2014/0114665 A1 | 4/2014 | Murgia |
| 2014/0244273 A1 | 8/2014 | Laroche et al. |
| 2014/0274203 A1 | 9/2014 | Ganong et al. |
| 2014/0278435 A1 | 9/2014 | Ganong et al. |
| 2014/0288928 A1 | 9/2014 | Penn et al. |
| 2014/0316783 A1 | 10/2014 | Medina |
| 2014/0348345 A1* | 11/2014 | Furst ............... H04R 3/00 381/111 |
| 2015/0031416 A1 | 1/2015 | Labowicz et al. |
| 2015/0193841 A1 | 7/2015 | Bernard |
| 2016/0077574 A1 | 3/2016 | Bansal et al. |

FOREIGN PATENT DOCUMENTS

| | | |
|---|---|---|
| KR | 1020150121038 | 10/2015 |
| WO | WO2013150325 A1 | 10/2013 |
| WO | WO2014063104 A2 | 4/2014 |
| WO | WO2014134216 A1 | 9/2014 |
| WO | WO2014172167 A1 | 10/2014 |
| WO | WO2015102606 A1 | 7/2015 |

OTHER PUBLICATIONS

International Search Report & Written Opinion dated May 1, 2015 in Patent Cooperation Treaty Application No. PCT/US2015/010312, filed Jan. 6, 2015, 12 pp.

Karakos, Damianos et al., "Score Normalization and System Combination for Improved Keyword Spotting," Proc. Automatic Speech Recognition and Understanding, pp. 210-215, Dec. 8-12, 2013.

International Search Report & Written Opinion dated Apr. 29, 2014 in Patent Cooperation Treaty Application No. PCT/US2013/065765, filed Oct. 18, 2013.

International Search Report & Written Opinion dated Sep. 11, 2014 in Patent Cooperation Treaty Application No. PCT/US2014/033559, filed Apr. 9, 2014.

(56) References Cited

OTHER PUBLICATIONS

Hinton, G. et al., "Deep Neural Networks for Acoustic Modeling in Speech Recognition", IEEE Signal Processing Magazine, Nov. 2012, pp. 82-97.
Laroche, Jean et al., "Noise Suppression Assisted Automatic Speech Recognition", U.S. Appl. No. 12/962,519, filed Dec. 7, 2010.
Medina, Eitan Asher, "Cloud-Based Speech and Noise Processing", U.S. Appl. No. 61/826,915, filed May 23, 2013.
Laroche, Jean et al., "Adapting a Text-Derived Model for Voice Sensing and Keyword Detection", U.S. Appl. No. 61/836,977, filed Jun. 19, 2013.
Santos, Peter et al., "Voice Sensing and Keyword Analysis", U.S. Appl. No. 61/826,900, filed May 23, 2013.
Non-Final Office Action, Sep. 30, 2015, U.S. Appl. No. 14/191,241, filed Feb. 26, 2014.
Non-Final Office Action, Jan. 13, 2016, U.S. Appl. No. 14/548,220, filed Nov. 19, 2014.
Non-Final Office Action, Feb. 11, 2016, U.S. Appl. No. 14/667,650, filed Mar. 24, 2015.
Non-Final Office Action, Jan. 10, 2007, U.S. Appl. No. 10/439,284, filed May 14, 2003.
Final Office Action, May 24, 2007, U.S. Appl. No. 10/439,284, filed May 14, 2003.
Advisory Action, Aug. 6, 2007, U.S. Appl. No. 10/439,284, filed May 14, 2003.
Notice of Allowance, Sep. 14, 2007, U.S. Appl. No. 10/439,284, filed May 14, 2003.
Non-Final Office Action, Dec. 12, 2012, U.S. Appl. No. 12/908,746, filed Oct. 20, 2010.
Final Office Action, Apr. 9, 2013, U.S. Appl. No. 12/908,746, filed Oct. 20, 2010.
Non-Final Office Action, Nov. 20, 2013, U.S. Appl. No. 12/908,746, filed Oct. 20, 2010.
Notice of Allowance, Jul. 23, 2014, U.S. Appl. No. 12/908,746, filed Oct. 20, 2010.
Non-Final Office Action, Aug. 13, 2015, U.S. Appl. No. 14/058,138, filed Oct. 18, 2013.
Non-Final Office Action, Jun. 5, 2015, U.S. Appl. No. 14/249,255, filed Apr. 9, 2014.
Non-Final Office Action, Aug. 26, 2015, U.S. Appl. No. 14/308,585, filed Jun. 18, 2014.
Non-Final Office Action, Apr. 15, 2016, U.S. Appl. No. 14/522,264, filed Oct. 23, 2014.
Final Office Action, Apr. 26, 2016, U.S. Appl. No. 14/308,585, filed Jun. 18, 2014.
Non-Final Office Action, May 17, 2016, U.S. Appl. No. 14/614,348, filed Feb. 4, 2015.
Notice of Allowance, May 20, 2016, U.S. Appl. No. 14/667,650, filed Mar. 24, 2015.
Final Office Action, Aug. 1, 2016, U.S. Appl. No. 14/522,264, filed Oct. 23, 2014.

\* cited by examiner

CONTINUOUS VOICE SENSING

CROSS-REFERENCE TO RELATED APPLICATION

The present application claims the benefit of U.S. Provisional Application No. 61/881,868, filed on Sep. 24, 2013. The subject matter of the aforementioned application is incorporated herein by reference for all purposes.

FIELD

The present application relates generally to audio processing, and, more specifically, to systems and methods for continuous voice sensing.

BACKGROUND

In the majority of the existing mobile systems, access to a mobile device (or services), may be obtained, for example, by touching the mobile device to wake it up from a low power state (also referred to herein as a "low power mode" or "sleep mode"). In the low power mode, it is desired that the power consumption be minimized to maximize the battery charge life span. Once the mobile device is awakened, it may operate at an operational mode, which consumes more power than the low state mode. An application processor (AP) may execute different voice sensing applications, including a voice user interface to operate the mobile device. Some mobile devices can allow waking up the mobile device from the sleep mode using a voice command. The time to wake up the application processor and the time to startup a voice recognition application can take quite a long time (e.g., between 500 ms to up to 1 or 2 seconds). Systems and methods for a smooth and fast transition from a low power (sleep mode) to a fully operational mode are desirable.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Provided are systems and methods for continuous voice sensing. According to an example embodiment, the method for continuous voice sensing may include detecting and buffering, by a first module, a key phrase in an acoustic signal. The acoustic signal can include at least one captured sound. In some embodiments, the acoustic signal may be provided to the first module by at least one Pulse Density Modulation digital microphone.

Responsive to the detection, the method may include sending an interrupt to a second module and switching the first module to an omnidirectional microphone mode. In some embodiments, the interrupt can be sent via a General-Purpose Input/Output port. The method may further include booting up the second module from a low power mode to an operational mode. In certain embodiments, the boot time can be 30 ms.

In various embodiments, while booting the second module, the method may further include continue buffering, by the first module, a clean speech output. The clean speech output can be generated by the first module from a further acoustic signal using an automatic speech recognition assist application. In some embodiments, the further acoustic signal can be captured by at least one omnidirectional microphone.

In some embodiments, after booting the second module, the method may allow sending, by the second module to the first module, an indication that the second module is ready to exchange data using one of the following interfaces: SLIMbus, Universal Asynchronous Receiver/Transmitter (UART), System Packet Interface (SPI) and I2C In some embodiments, the method further proceeds with sending the clean speech output buffered by the first module to the second module. In further embodiments, the method further includes exchanging further data between the first module and the second module.

In various embodiments, the method further comprises detecting and buffering another key phrase and response to the detection of both key phrases, triggering at least two of different voice search engines, different voice search engines, or different applications.

In some embodiments, the detecting and buffering, by a first module, a key phrase in an acoustic signal comprises detecting and buffering separately two key phrases such that clean speech output associated with the two key phrases are provided for respectively launching different voice search engines, different voice recognition engines, or different applications. For example, each key phrase may be provided for triggering launch of a different one of two voice search engines, different one of two voice recognition engines, or different one of two applications.

According to another example embodiment of the present disclosure, the steps of the method for continuous voice sensing are stored on a non-transitory machine-readable medium comprising instructions, which when implemented by one or more processors perform the recited steps.

Other example embodiments of the disclosure and aspects will become apparent from the following description taken in conjunction with the following drawings.

BRIEF DESCRIPTION OF THE DRAWINGS

Embodiments are illustrated by way of example and not limitation in the figures of the accompanying drawings, in which like references indicate similar elements and in which.

DETAILED DESCRIPTION

The present disclosure provides example systems and methods for voice sensing and authentication. By way of example and not limitation, embodiments of the present disclosure can be practiced on mobile devices.

According to various example embodiments, a method for continuous voice sensing includes detecting and buffering, by a first module, a key phrase in an acoustic signal. The acoustic signal can include at least one captured sound. Upon detection of the key phrase (or keyword), the method may allow sending an interrupt to a second module and switching the first module to an omnidirectional microphone mode. After receiving the interrupt, the second module may boot from a low power mode to an operational mode and send an indication that it is ready to exchange data with the first module via a fast connection. While the second module is booting, the method may include continue buffering, by the first module, a clean speech output. The method may proceed with sending, by the first module, the clean speech output to the second module. The method may further include exchanging further data between the first module and second module.

Figure 1:
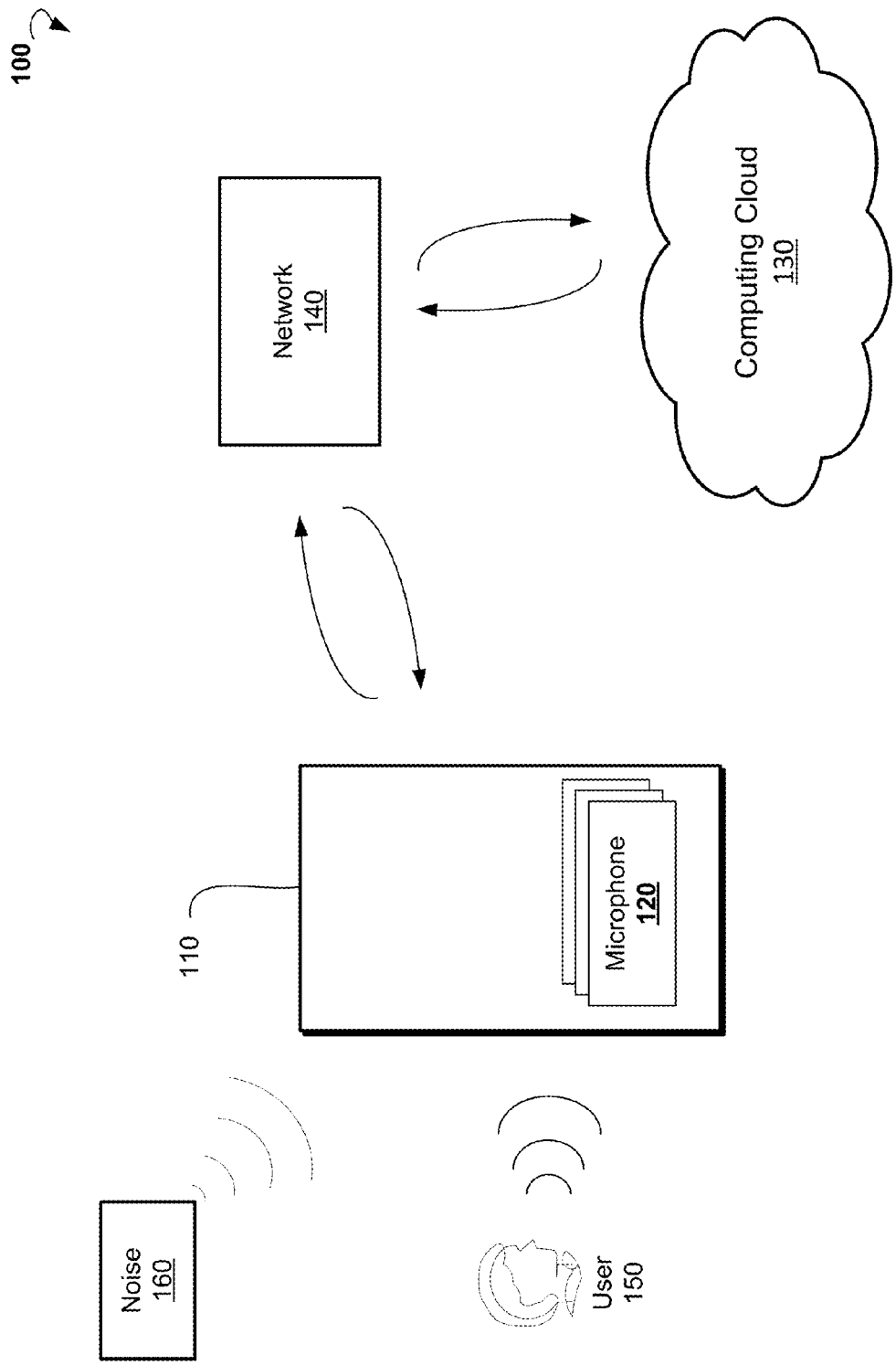
FIG. 1 is an example embodiment wherein a method for continuous voice sensing can be practiced.

Referring now to FIG. 1, an example environment 100 is shown in which a method for continuous voice sensing can be implemented. The example environment 100 can include a mobile device 110. In various embodiments, the mobile device 110 may be operable to receive acoustic signal(s). In some embodiments, the mobile device can be operable to receive acoustic sound(s) from a user 150. In certain embodiments, the mobile device may include one or more microphones 120. The acoustic signal(s) can be captured by the one or more microphones 120. In various embodiments, the mobile device can be further operable to process the received acoustic input signal(s) in order to detect a voice, one or more spoken keyword(s), and so forth.

The acoustic input signals may be contaminated by noise 160. Noise can include unwanted sound present in the environment which may be detected by, for example, sensors such as microphones 120. In stationary environments, noise sources may include street noises, ambient noises, sounds from the mobile device such as audio, speech from entities other than an intended speaker(s), and the like. Mobile environments can encounter certain kinds of noise which arise from their operations and the environments in which they operate.

In some embodiments, the environment 100 may include one or more cloud-based computing resources 130, also referred as a computing cloud(s) 130. The cloud-based computing resource(s) 130 can include computing resources (hardware and software) available at a remote location and accessible over a network (for example, the Internet). The cloud-based computing resources 130 can be shared by multiple users and can be dynamically reallocated based on demand. The cloud-based computing resources 130 may include one or more server farms/clusters including a collection of computer servers which can be colocated with network switches and/or routers. In various embodiments, the mobile device 110 can be connected to the computing cloud 130 via one or more wired or wireless communications networks 140.

Figure 2:
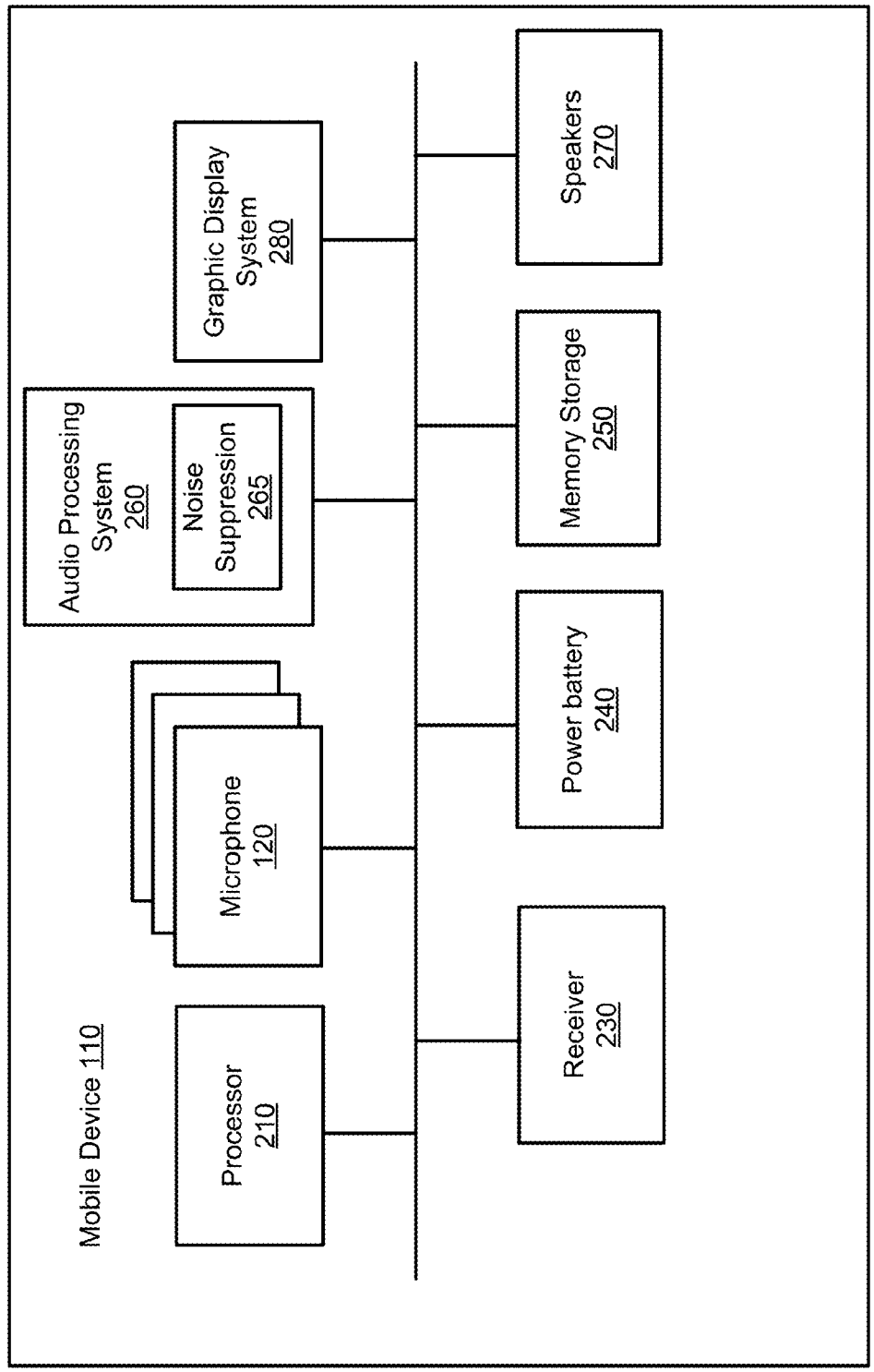
FIG. 2 is a block diagram of a mobile device that implements a method for continuous voice sensing, according to various embodiments.

FIG. 2 is a block diagram of a mobile device 110 that can be used to implement a method for continuous voice sensing, according to an example embodiment. The FIG. 2 illustrates specifics of the mobile device 110 of FIG. 1. In the illustrated embodiment, the mobile device 110 can include a processor 210, one or more microphone 120, a receiver 230, memory storage 250, an audio processing system 260, speakers 270, graphic display system 280, and a power battery 240. The mobile device 110 may include additional or other components necessary for operations of mobile device 110. Similarly, in other embodiments, the mobile device 110 may include fewer components to perform functions similar or equivalent to those depicted in FIG. 2.

The processor 210 may include hardware and/or software, which is operable to execute computer programs stored, for example, in a memory storage 250. The processor 210 may use floating point operations, complex operations, and other operations, including, for example, continuous voice sensing. In some embodiments, the processor 210 may include an Application Processor (AP). In certain embodiments, the AP may include a circuit (e.g., a dedicated chipset) running an operating system and software applications on the mobile device 110.

In various embodiments, the software applications may include an Automatic Speech Recognition Assist (ASR-A). The ASR-A may be a specialized Noise Suppression method or system minimizing the background noise when maximizing the correct automatic recognition of the device target user speech. Various embodiments of the ASR-A may include a module executed as a front end module of an ASR server located either on the mobile device 110 or in the computing cloud 130 (shown in FIG. 1).

The software applications may include a Voice Sense (VS). The VS may include detection of voice commands while a mobile device is in a low power mode.

In some embodiments, the software applications may include Continuous Voice Sense (CVS). The CVS may include detection of voice commands while a mobile device is in a low power mode and seamless transition to an ASR-A mode.

The graphic display system 280 can provide a user graphic interface. In some embodiments, a touch screen associated with the graphic display system can be utilized to receive an input from a user. The options can be provided to a user via an icon or text buttons once the user touches the screen.

The audio processing system 260 can be operable to receive acoustic signals from an acoustic source via one or more microphones 120 and process the acoustic signal components. The microphones 120 can be spaced a distance apart such that the acoustic waves impinging on the device from certain directions exhibit different energy levels at the two or more microphones. After reception by the microphones 120, the acoustic signals can be converted into electric signals. These electric signals can, in turn, be converted by an analog-to-digital converter (not shown) into digital signals for processing in accordance with some embodiments. In some embodiments, the microphones 120 may include pulse density modulation (PDM) microphones also referred to as digital microphones. The PDM may include a system for representing a sampled signal as a stream of single bits. In some embodiments, the PDM may be a high sampling rate, single-bit digital system.

In various embodiments, where the microphones 120 are omni-directional microphones that are closely spaced (e.g., 1-2 cm apart), a beamforming technique can be used to simulate a forward-facing and backward-facing directional microphone response. A level difference can be obtained using the simulated forward-facing and a backward-facing directional microphone. The level difference can be used to discriminate speech and noise in, for example, the time-frequency domain, which can be used in noise and/or echo reduction. In certain embodiments, some microphones 120 can be used mainly to detect speech and other microphones can be used mainly to detect noise. In other embodiments, some microphones 120 can be used to detect both noise and speech.

In order to suppress the noise, the audio processing system 260 may include a noise reduction module 265. Noise suppression (NS) can be carried out by the audio processing system 260 and noise reduction module 265 of the mobile device 110 based variously on an inter-microphone level difference, level salience, pitch salience, signal type classification, speaker identification, and so forth. By way of example and not limitation, noise reduction methods are described in U.S. Utility patent application Ser. No. 12/215,980, entitled "System and Method for Providing Noise Suppression Utilizing Null Processing Noise Subtraction," filed Jun. 30, 2008, and in U.S. Utility patent application Ser. No. 11/699,732, entitled "System and Method for Utilizing Omni-Directional Microphones for Speech Enhancement," filed Jan. 29, 2007, disclosures of which are incorporated herein by reference for the foregoing purposes.

Figure 3:
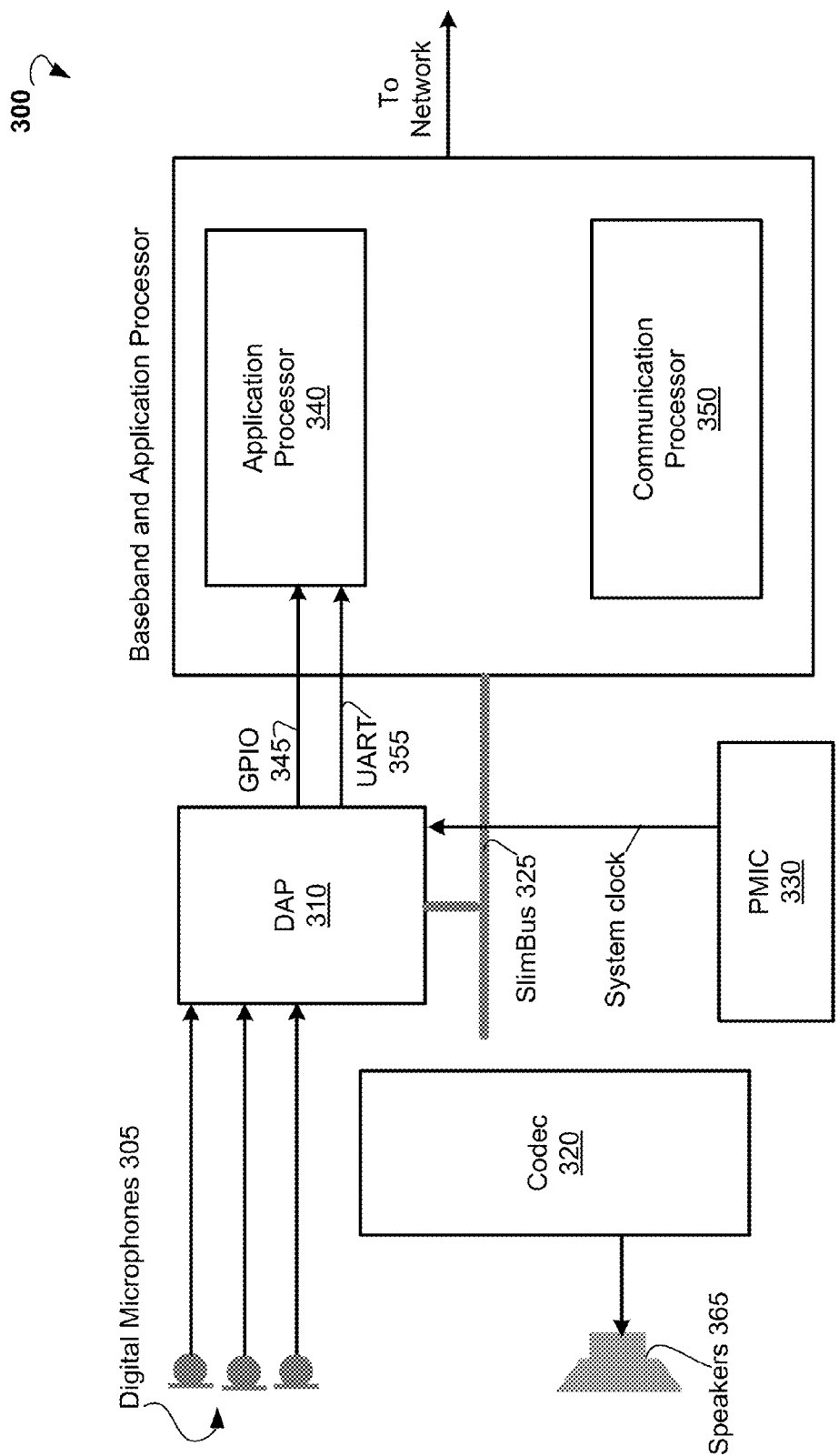
FIG. 3 is a block diagram showing a system for continuous voice sensing, according to an example embodiment.
Figure 4:
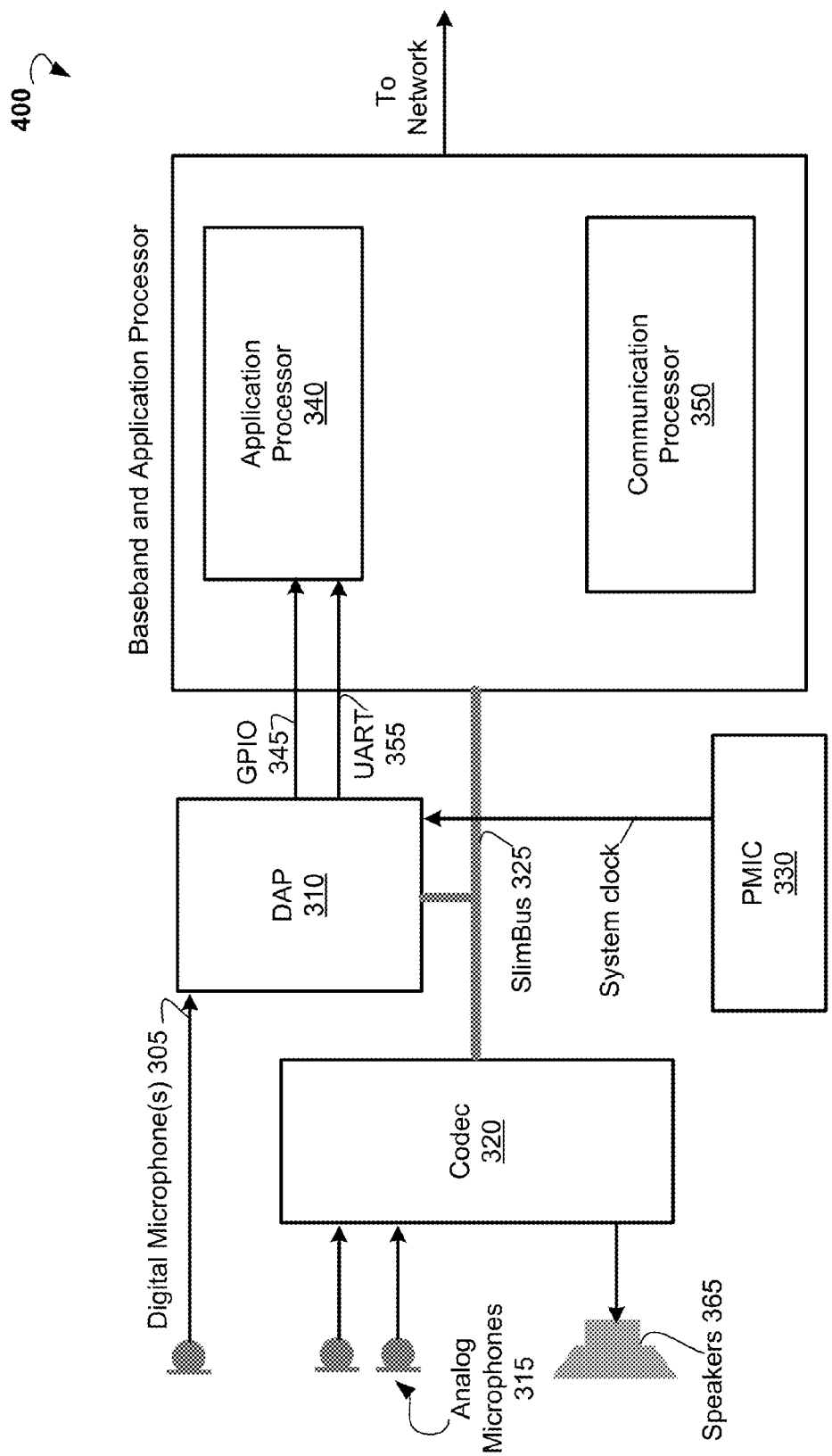
FIG. 4 is a block diagram showing a system for continuous voice sensing, according to another example embodiment.

FIGS. 3 and 4 show two example systems 300 and 400 for continuous voice sensing. The system 300 may be integrated into the mobile device 110 (shown in FIG. 1 and FIG. 2). The system 400 may also be integrated into the mobile device 110.

The example systems in FIGS. 3 and 4 include many similar elements, but have different configurations regarding microphones and the coupling thereto, as is described below and shown in FIGS. 3 and 4. In FIG. 3, the system 300 includes digital microphones 305, three shown in this example, coupled to a Digital Audio Processor (DAP) module 310. In FIG. 4, the system 400 includes analog microphones 315, two shown in this example, coupled to a codec 320, and at least one digital microphone 305 coupled to the DAP module 310 operable to receive acoustic sounds from at least one digital microphone 305. Various elements and operations of the systems 300 and 400 are described further below.

Various embodiments of the DAP module 310 may include any of an electronic circuit, a combinational logic circuit, an integrated circuit, an application-specific standard product (ASSP), an application-specific integrated circuit (ASIC), a field programmable gate array (FPGA), a processor (shared, dedicated, or group) that executes one or more software or firmware programs, and/or other suitable components that provide the described functionality. The DAP module 310 may include a Voice Sense application and Automatic Speech Recognition Assist (ASR-A) application.

Voice Sense (VS) can include detection of voice commands while a mobile device is in a low power mode. In some embodiments, access to device services is enabled, for example, by simply uttering a predefined command to "wake up" the system. In various embodiments, the detection of the voice command is achieved while keeping the power consumption low (e.g., below 2 mW). These systems and methods may be referred to as Voice Wake Up or Voice Sense.

Automatic Speech Recognition Assist (ASR-A) may include a specialized noise suppression method or system minimizing the background noise when maximizing the correct automatic recognition of the device target user speech.

The system 300 may further include a power management integrated circuit (PMIC) 330, an application processor (AP) 340, and a communication processor 350. The codec 320, DAP module 310, application processor 340, and communication processor 350 can be interconnected with SLIMbus 325. The DAP module 310 can be operable to transmit data to application processor (AP) 340 and/or receive data from application processor 340 via, for example, a General-purpose input/output (GPIO) port and/or universal asynchronous receiver/transmitter (UART) port 355. The codec 320 may be operable to receive acoustic signal(s) from one or more analog microphones 315 and provide an audio signal to speakers 365.

In some embodiments, the DAP module 310 and codec 320 may be combined/integrated as a single module/unit. The voice sensing functionality may be performed within a digital subsystem of a codec in some embodiments.

Usage of voice to access the device services may further include any active power states of the mobile device, allowing access to the device services through usage of the voice command. These systems and methods may be referred to as Continuous Voice Sense. The Continuous Voice Sense mode may provide seamless transition from a low power mode to an active power mode. For example, a user may address a mobile device by enunciating the wake up command and without any unnatural pause continue speaking any other possible command(s). By way of example and not limitation, "OK earSmart, call Paul's cell phone." In some embodiments, software and hardware architectures may be optimized to achieve a low-power, low-latency, and highly reliable solution.

The description of the following embodiments is provided by way of example and not limitation, variously for system 300 and 400 and their different microphone configuration, where PDM microphone refers to a digital microphone as noted above:

Example 1a

1 PDM Microphone Coupled to DAP, 2 Other Microphones Coupled to a CODEC

By way of example and not limitations, one the following sequence of steps can be carried out:

Step 1: When operating the mobile device 110 in a low power mode, the Voice Sense application on DAP module 310 may run, while the AP 340, communication processor 350, and codec 320 may be put into a sleep mode. The PDM (digital) microphone 305 may be operable to provide a stream representing an acoustic sound to the DAP module 310 at a pre-determined sampling rate. In some embodiments, the pre-determined sampling rate may be, for example, 8 or 16 kHz. The DAP module 310 is operable to listen, buffer and detect a voice. PMIC 330 may be operable to provide a pulse to the DAP module 310 at a 9.6 MHz rate. In other embodiments, the DAP module 310 includes an internal oscillator for generating, for 1 mA, the system clock.

Step 2: In some embodiments, the DAP module 310 may be operable to detect and buffer a voice signal and determine the voice signal includes a key phrase. Upon the determination, the DAP module 310 may set the GPIO line and send an interrupt to the AP 340. Upon receiving the interrupt, the AP 340 may start a bring up (wake up) sequence. A route definition may be preserved in a memory of the DAP module 310.

Step 3: At the same time, upon detecting the key phrase, the DAP module 310 may be operable to be switch to a one-microphone automatic speech recognition assistant (ASR-A) omnidirectional mode.

Step 4: While booting the AP 340 operating, the DAP module 310 may continue buffering clean speech with, for example, 16 bits sample at 16 kHz. The boot time of AP 340 may be, for example, around 30 ms. The clean speech can be generated from an acoustic sound detected with the digital microphone 305 using, for example, noise suppression or noise reduction techniques.

Step 5: Upon waking up, the application processor 340 may communicate and/or indicate by an application programming interface (API) that it is ready to exchange data, for example, over at least one of SlimBus, Universal Asynchronous Receiver/Transmitter (UART), and System Packet Interface (SPI).

Step 6: The buffer or clean speech output accumulated up to that point may be sent to the application processor 340, for example, using a fast interface such as UART or SPI. The UART or SPI interface may advantageously minimize response of the system during normal operation.

Step 7: In some embodiments, the DAP module 310 and AP 340 may continue to exchange data using, for example, the fast interface (for example, UART or SPI) from this point on. Alternatively, in other embodiments, the SLIMbus 325 may be used. The AP may realign the samples.

Example 1b

2 PDM Microphones Coupled to DAP, 1 Other Microphone Coupled to a CODEC

If a two-microphone ASR assist is desired, then the two digital microphones 305 (e.g., PDM microphones disposed on top of the mobile device) may be coupled directly to the DAP module 310 (e.g., two digital microphones 305 coupled to the DAP module 310 in the system 400 in FIG. 4). The two-microphone ASR assist may start processing without any involvement of the AP 340.

Example 1.c

1 PDM Microphone Coupled to DAP, 2 Other Microphones Coupled to a CODEC

In some embodiments, alternatively or in addition, once a first ASR command is recognized using one-microphone ASR assist, the Application 340 may reconfigure the DAP module 310 to a two-microphone ASR Assist Far Talk Omnidirectional mode and configure the Codec 320 and (for example) the SLIMBus connection accordingly.

In some embodiments, option 1.b may be selected as subordinate to option 1.c.

Example 2

By way of example and not limitations one the following sequence of steps can be carried out:

Step 1: Voice Sense application on the DAP module 310 may commence. The AP 340 may be put into a sleep mode. In case of PDM, the Codec 320 may also be in a sleep mode, and the PDM digital microphone 305 may be coupled to the DAP module 310. The sampling rate of an audio signal stream provided from digital microphone 305 to the DAP module 310 may be 8 or 16 kHz.

Step 2: The DAP module 310 may detect the key phrase and send an interrupt to the AP 340. In response, the AP 340 may start the bring up sequence. The AP may first start the Codec 320 and connect the DAP module 310 and Codec 320.

Step 3: The DAP may switch to the two-microphone ASR assist omnidirectional mode. The boot time, for example, may be around 30 ms. The route definition may be preserved in a memory of the DAP module 310. The DAP module 310 may expect to receive samples, for example, at least at 16 kHz rate. In some embodiments, a rate of 48 kHz may be used with the samples being downsampled to 16 kHz.

Step 4: The clean speech output of the DAP module 310 may be buffered, for example, with 16 bits/sample at 16 kHz. The clean speech can be generated from an acoustic sound detected with digital microphones 305 by ASR-A using, for example, noise suppression or noise reduction techniques.

Step 5: The host may communicate/indicate that it is ready to exchange data by API over at least one of SlimBus, UART, and SPI.

Step 6: The buffer or clean speech output accumulated up to that point may be sent to the host using a fast interface such as UART or SPI, which may advantageously minimize response of the system during a normal operation.

Step 7: From this point on the DAP module 310 and AP 340 may continue to exchange data using the fast interface (for example, UART or SPI). Alternatively, the SLIMbus interface 325 may be used, but in this case the AP 340 may at least realign the samples.

In some embodiments, the following circumstances may apply:

a. An Original Equipment Manufacturer (OEM) may have full control of the ASR application, and the audio input to the application may be sourced from the operation system (OS) files system, instead of the standard audio interfaces.

b. The Application 340 may actually establish the connection from the Codec 320 to the eS7xx module 310 faster than completing the full wake up.

Figure 5:
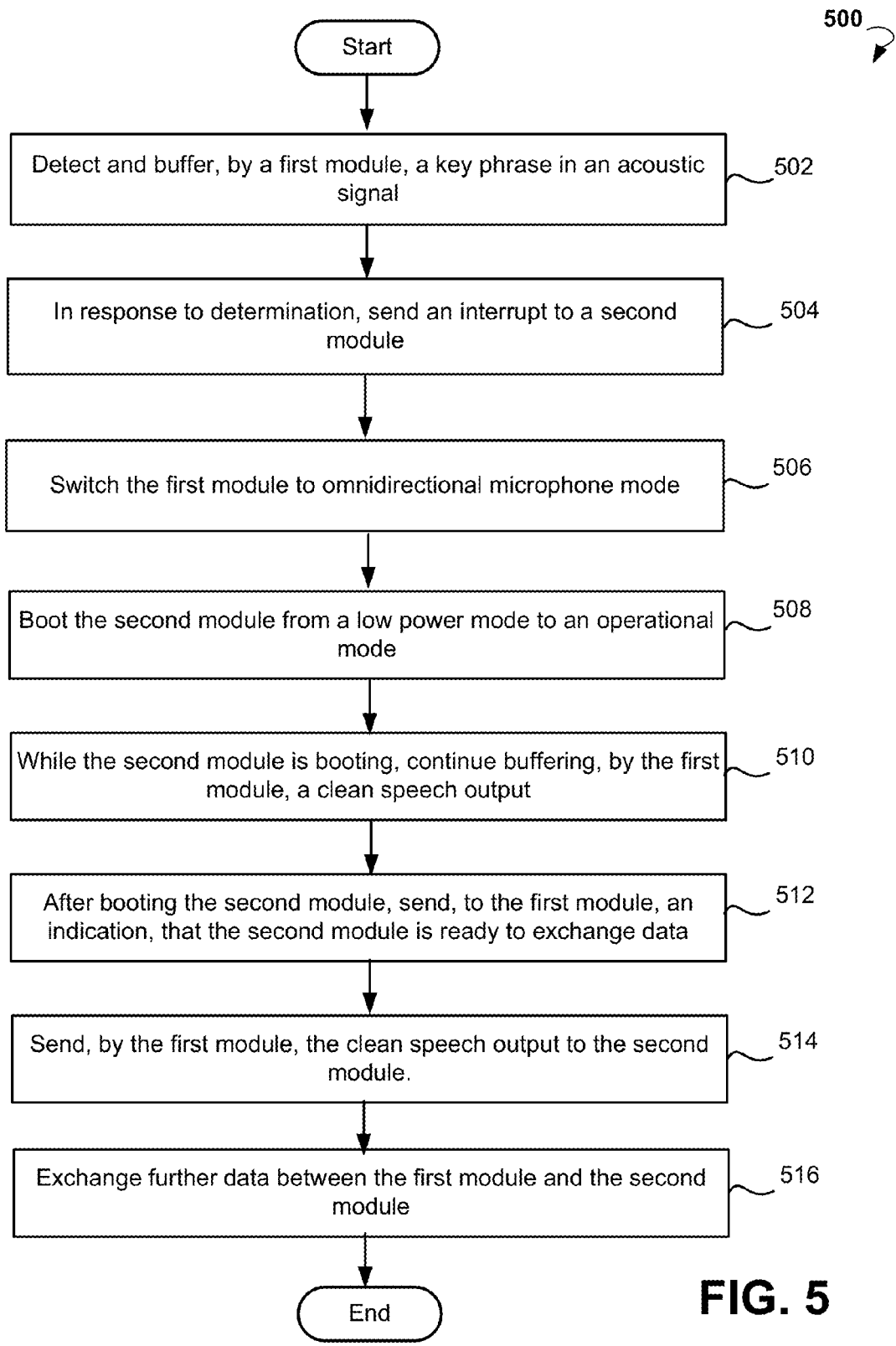
FIG. 5 is a flow chart showing steps of a method for continuous voice sensing, according to an example embodiment.

FIG. 5 is a flow chart showing steps of a method 500 for continuous voice sensing, according to an example embodiment. The method 500 can be implemented in the mobile device 110 (shown in FIG. 1 and FIG. 2) and systems 300 and 400 shown in FIGS. 3 and 4. The illustrated method 500 may commence at step 502 with detecting and buffering, by a first module, a key phrase in an acoustic signal. In some embodiments, the acoustic signal can be provided by one or more PDM microphones coupled to the first module. In step 504, the method 500 can proceed, in response to the detection, by sending an interrupt to a second module. In some embodiments, the interrupt can be sent via a GPIO port. In step 506, the method 500 can include switching the first module to omnidirectional microphone mode. In step 508, the method 500 may continue with booting the second module from a low power mode to an operational mode. In step 510, the method can include buffering, by the first module, a clean speech output, while the second module is booting.

In step 512, after the booting of the second module is complete, the method may proceed with sending, to the first module, an indication that the second module is ready to exchange data with the first module. In various embodiments, the data exchange can be carried by one of SlimBus, Universal Asynchronous Receiver/Transmitter (UART), and System Packet Interface (SPI). In step 514, the method can include sending, by the first module, the clean speech output to the second module. In step 516, the method may further proceed with exchanging further data between the first module and the second module.

In some embodiments, two keywords (or groups of key words where each group comprises a key phrase, e.g., "OK Google", "Hi Galaxy" or other key phrases), are separately processed such that the two keywords or key phrases both trigger launching of two different voice search engines (or voice recognition engines) or simply two applications (e.g., application such as "S-Voice", "Google Voice Search", or other suitable applications). The keywords or key phrases and the associated clean speech output may be buffered and concatenated for providing to the two different voice search/recognition engines or the two applications. In other embodiments, each of the two keywords or key phrases may be processed by method and systems to each trigger a different application.

Various embodiments can be practiced on mobile devices. Mobile devices may be portable or stationary. Mobile devices can include radio frequency (RF) receivers, transmitters, and transceivers, wired and/or wireless telecommunications and/or networking devices, amplifiers, audio and/or video players, encoders, decoders, speakers, inputs, outputs, storage devices, and user input devices. Mobile devices may include inputs such as buttons, switches, keys, keyboards, trackballs, sliders, touch screens, one or more microphones, gyroscopes, accelerometers, global positioning system (GPS) receivers, and the like. Mobile devices may include outputs, such as LED indicators, video displays, touchscreens, speakers, and the like. In some embodiments, mobile devices may include hand-held devices, such as wired and/or wireless remote controls, notebook computers, tablet computers, phablets, smart phones, personal digital assistants, media players, mobile telephones, and the like.

The mobile devices may be used in stationary and mobile environments. Stationary environments may include residencies and commercial buildings or structures. The stationary environments can also include living rooms, bedrooms, home theaters, conference rooms, auditoriums, and the like. In the mobile environments, a system may be moving with a vehicle, carried by a user, or be otherwise transportable.

Figure 6:
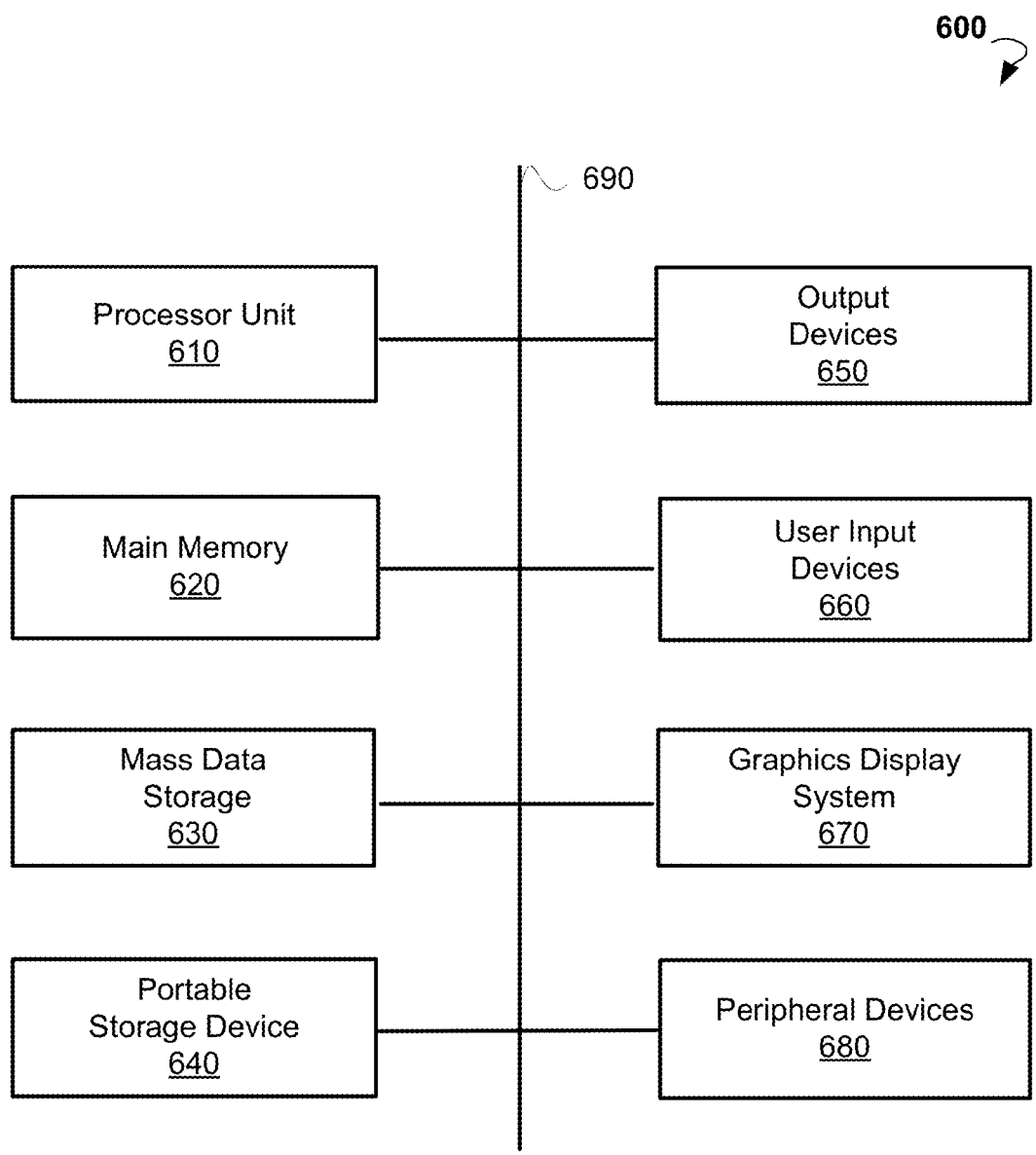
FIG. 6 is an example of a computer system implementing a method for continuous voice sensing, according to an example embodiment.

FIG. 6 illustrates an exemplary computer system 600 that may be used to implement some embodiments of the present invention. The computer system 600 of FIG. 6 may be implemented in the contexts of the likes of computing systems, networks, servers, or combinations thereof. The computer system 600 of FIG. 6 includes one or more processor units 610 and main memory 620. Main memory 620 stores, in part, instructions and data for execution by processor units 610. Main memory 620 stores the executable code when in operation, in this example. The computer system 600 of FIG. 6 further includes a mass data storage 630, portable storage device 640, output devices 650, user input devices 660, a graphics display system 670, and peripheral devices 680.

The components shown in FIG. 6 are depicted as being coupled via a single bus 690. The components may be coupled through one or more data transport means. Processor unit 610 and main memory 620 are coupled via a local microprocessor bus, and the mass data storage 630, peripheral device(s) 680, portable storage device 640, and graphics display system 670 are coupled via one or more input/output (I/O) buses.

Mass data storage 630, which can be implemented with a magnetic disk drive, solid state drive, or an optical disk drive, is a non-volatile storage device for storing data and instructions for use by processor unit 610. Mass data storage 630 stores the system software for implementing embodiments of the present disclosure for purposes of loading that software into main memory 620.

Portable storage device 640 operates in conjunction with a portable non-volatile storage medium, such as a flash drive, floppy disk, compact disk, digital video disc, or Universal Serial Bus (USB) storage device, to input and output data and code to and from the computer system 600 of FIG. 6. The system software for implementing embodiments of the present disclosure is stored on such a portable medium and input to the computer system 600 via the portable storage device 640.

User input devices 660 can provide a portion of a user interface. User input devices 660 may include one or more microphones, an alphanumeric keypad, such as a keyboard, for inputting alphanumeric and other information, or a pointing device, such as a mouse, a trackball, stylus, or cursor direction keys. User input devices 660 can also include a touchscreen. Additionally, the computer system 600 as shown in FIG. 6 includes output devices 650. Suitable output devices 650 include speakers, printers, network interfaces, and monitors.

Graphics display system 670 include a liquid crystal display (LCD) or other suitable display device. Graphics display system 670 is configurable to receive textual and graphical information and processes the information for output to the display device.

Peripheral devices 680 may include any type of computer support device to add additional functionality to the computer system.

The components provided in the computer system 600 of FIG. 6 are those typically found in computer systems that may be suitable for use with embodiments of the present disclosure and are intended to represent a broad category of such computer components that are well known in the art. Thus, the computer system 600 of FIG. 6 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX ANDROID, IOS, CHROME, TIZEN and other suitable operating systems.

The processing for various embodiments may be implemented in software that is cloud-based. In some embodiments, the computer system 600 is implemented as a cloud-based computing environment, such as a virtual machine operating within a computing cloud. In other embodiments, the computer system 600 may itself include a cloud-based computing environment, where the functionalities of the computer system 600 are executed in a distributed fashion. Thus, the computer system 600, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that comprise a plurality of computing devices, such as the computer system 600, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

The present technology is described above with reference to example embodiments. Therefore, other variations upon the example embodiments are intended to be covered by the present disclosure.

What is claimed is:

1. A method for continuous voice sensing comprising:
   detecting and buffering, by a first module, a key phrase in an acoustic signal, the acoustic signal including at least one captured sound; and
   responsive to the detection:
      sending an interrupt to a second module, the second module being responsive to the interrupt to boot up from a low power mode to an operational mode;
      while the second module is booting up, continue buffering, by the first module, a clean speech output; and
      switching the first module to an omnidirectional microphone mode.

2. The method of claim 1, wherein the interrupt is sent via a General-Purpose Input/Output port.

3. The method of claim 1, wherein the acoustic signal is provided to the first module by at least one Pulse Density Modulation microphone.

4. The method of claim 1, wherein the second module is booted up in substantially 30 ms.

5. The method of claim 1, further comprising after booting up the second module, sending, by the second module to the first module, an indication that the second module is ready to exchange data using at least one of the following interfaces: SlimBus, Universal Asynchronous Receiver/Transmitter (UART), and System Packet Interface (SPI).

6. The method of claim 1, wherein the clean speech output is generated from a further acoustic signal.

7. The method of claim 6, wherein the further acoustic signal is captured by at least one omnidirectional microphone and wherein the clean speech output is generated as a result of noise suppression or noise reduction.

8. The method of claim 1, further comprising detecting and buffering another key phrase and in response to the detection of both key phrases, triggering at least two different voice search engines, two different recognition engines, or two different applications.

9. The method of claim 1, wherein the detecting and buffering, by the first module, the key phrase in the acoustic signal comprises detecting and buffering separately two key phrases such that clean speech output associated with the two key phrases are provided for respectively launching different voice search engines, different voice recognition engines, or different applications.

10. The method of claim 1, further comprising sending the clean speech output by the first module to the second module.

11. A system for continuous voice sensing comprising:
    a first module, the first module operable to:
       detect and buffer a key phrase in an acoustic signal, the acoustic signal including at least one captured sound; and
       in response to the detection:
          send an interrupt to a second module, the second module being responsive to the interrupt to boot up from a low power mode to an operational mode;
          while the second module is booting up, continue to buffer, by the first module, a clean speech output; and
          switch to an omnidirectional microphone mode.

12. The system of claim 11, wherein the interrupt is sent via a General-Purpose Input/Output port.

13. The system of claim 12, wherein the acoustic signal is provided to the first module by at least one Pulse Density Modulation microphone.

14. The system of claim 11, wherein after booting up, the second module is operable to send to the first module an indication that the second module is ready to exchange data using at least one of the following interfaces: SlimBus, Universal Asynchronous Receiver/Transmitter (UART), and System Packet Interface (SPI); and
    wherein after receiving the indication from the second module, the first module is further operable to send the clean speech output to the second module.

15. The system of claim 11, wherein the clean speech output is generated based on a further acoustic signal.

16. The system of claim 15, wherein the further acoustic signal is captured by at least one omnidirectional microphone and wherein the clean speech output is generated as a result of noise suppression or noise reduction.

17. A non-transitory processor-readable medium having embodied thereon a program being executable by at least one processor to perform a method for continuous voice sensing, the method comprising:
    detecting and buffering, by a first module, a key phrase in an acoustic signal, the acoustic signal including at least one captured sound; and
    responsive to the detection:
       sending an interrupt to a second module, the second module being responsive to the interrupt to boot up from a low power mode to an operational mode;
       while the second module is booting up, continue buffering, by the first module, a clean speech output; and
       switching the first module to an omnidirectional microphone mode.

* * * * *